United States Patent [19]
Park

[11] 4,416,466
[45] Nov. 22, 1983

[54] TRAILER HITCH GUIDE

[76] Inventor: W. Sidney Park, 513 Morningside Dr., Louisville, Ky. 40206

[21] Appl. No.: 260,754

[22] Filed: May 5, 1981

[51] Int. Cl.³ .............................................. B60D 1/06
[52] U.S. Cl. ................................ 280/477; 280/478 R; 280/511
[58] Field of Search ............... 280/477, 478 R, 478 B, 280/511, 508, 507

[56] References Cited
U.S. PATENT DOCUMENTS

| | | | |
|---|---|---|---|
| 1,626,993 | 5/1927 | Williams | 280/477 |
| 2,898,127 | 8/1959 | Plumb | 280/478 R |
| 3,156,315 | 11/1964 | Hawgood | 180/19.1 |
| 3,773,356 | 11/1973 | Eichels et al. | 280/477 |
| 4,254,968 | 3/1981 | DelVecchio | 280/477 |

Primary Examiner—Joseph F. Peters, Jr.
Assistant Examiner—Donn McGiehan
Attorney, Agent, or Firm—Birch, Stewart, Kolasch and Birch

[57] ABSTRACT

A trailer hitch guide is disclosed for guiding a ball, attached at the rear of an automobile or other towing vehicle, into a position of alignment directly under a socket on a trailer tongue of a trailer or other towed vehicle, the tongue being attached to the top surface of the trailer hitch guide. A v-flange on the bottom surface of the guide guides the ball into the position of alignment. Once the ball is in this position, the trailer hitch guide is removed in order to drop the socket of the trailer tongue over the towing ball.

4 Claims, 11 Drawing Figures

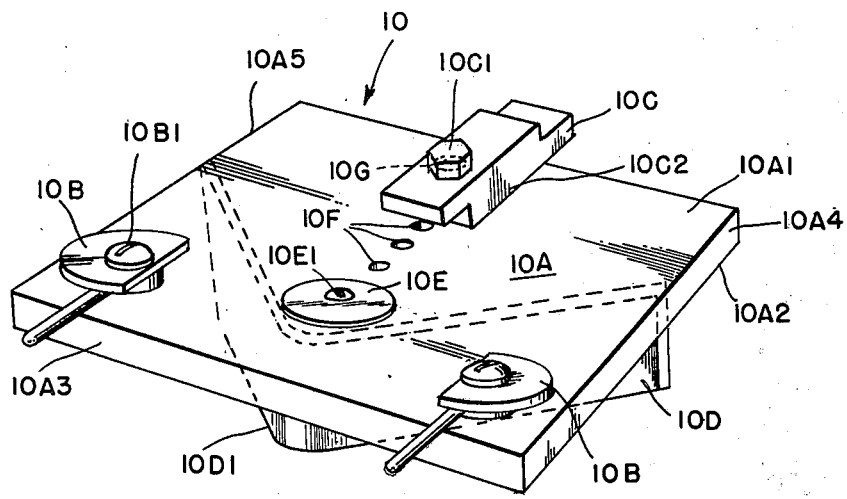
FIG.1
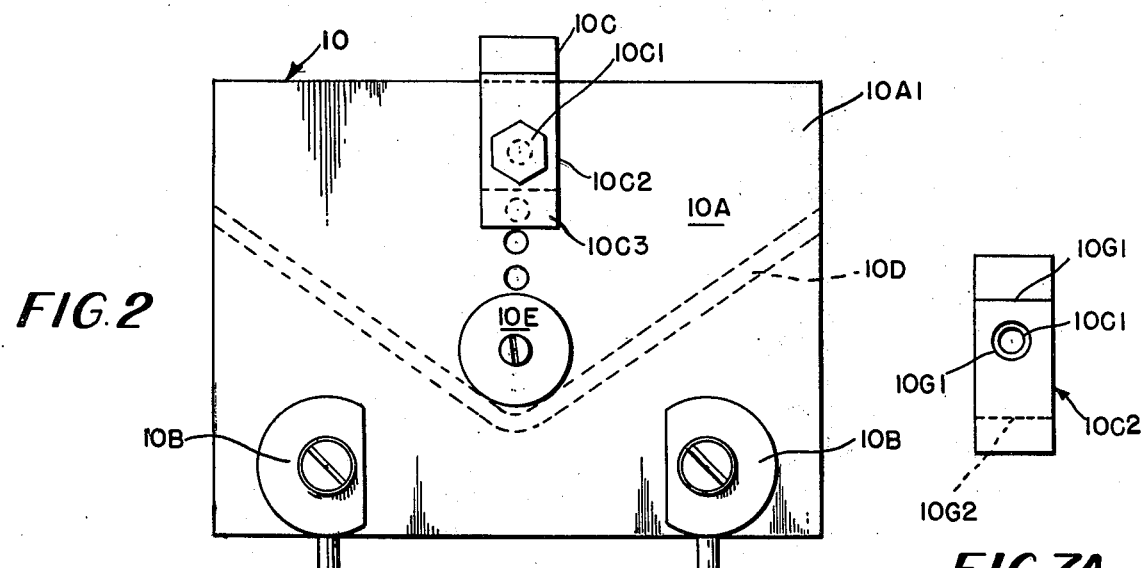
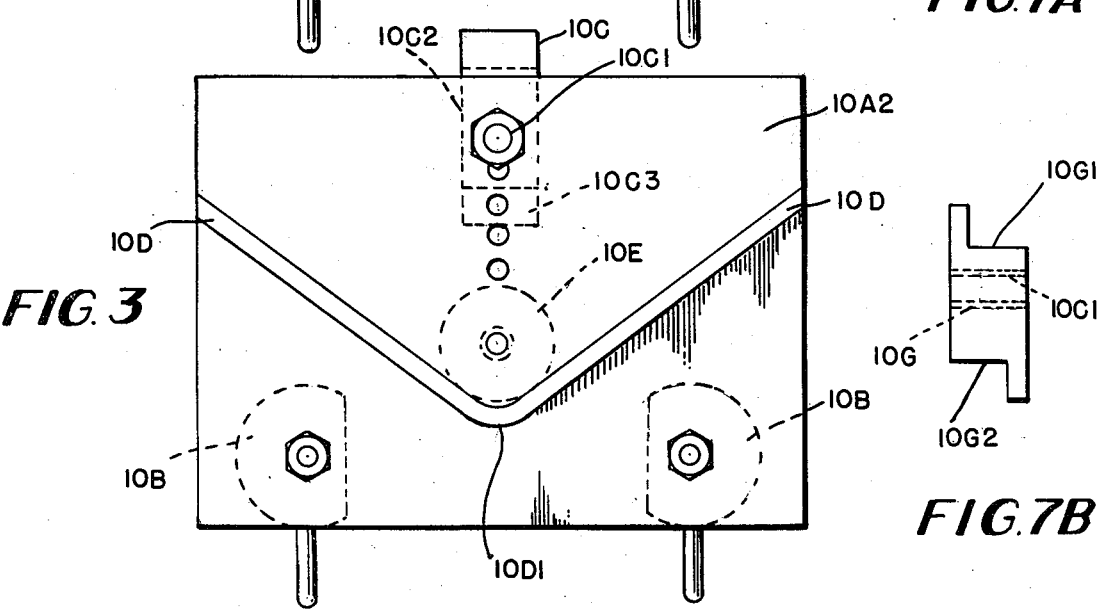

TRAILER HITCH GUIDE

FIELD OF THE INVENTION

This invention relates to a trailer hitch guide which is attached temporarily to a trailer tongue of a towed vehicle for use in guiding a socket on the tongue into a position of alignment relative to a towing ball mounted at the rear of a towing vehicle.

BACKGROUND OF THE INVENTION

When it is necessary to tow a trailer or other towed vehicle, the driver of an automobile or other towing vehicle must reverse the towing vehicle carefully into a position relative to the towed vehicle such that the towing ball, mounted at the rear of the towing vehicle, is accurately aligned with a socket on the trailer tongue of the towed vehicle. Once accurately aligned, the ball will easily insert into the socket of the trailer tongue.

However, it is very difficult for the driver of the towing vehicle to achieve this accurate alignment of the ball with the socket of the trailer tongue without assistance.

Accordingly, it is an object of the present invention to provide a trailer hitch guide which is attached to the tongue of the towed vehicle for guiding the towing ball of the towing vehicle into a position of alignment relative to the socket on the trailer tongue so that the towing ball will easily insert into the socket of the trailer tongue.

Another object of the present invention is to provide a trailer hitch guide which is adapted to mount onto different sized trailer tongues for different towed vehicles.

SUMMARY OF THE INVENTION

The trailer hitch guide of the present invention comprises a plate having at least two corners, a pair of clamps eccentrically mounted on the top surface of the plate, each clamp being mounted near two opposite corners, a stop removably mounted on the same surface as the pair of clamps and toward a forward edge of the plate and a flange, shaped in the form of a v, mounted and secured on the bottom surface of the plate such that the apex of the v-flange is toward the rear of the plate. The clamps may be a square or a rectangle in cross section, the right angle corners of the clamps providing movement, when rotated, similar to the movement of the eccentrically mounted clamps when they are rotated. The clamps are spaced from each other by a predetermined distance, the distance depending upon the width of the trailer tongue of the towed vehicle. Each clamp has a finger attached thereto for swivelling the associated clamp around its axis for engaging and disengaging the side surface of the trailer tongue thereby permitting the trailer hitch guide to be removed from the trailer tongue. The swivelling movement of the clamps allows the guide to adapt to trailer tongues having different widths. A circular-shaped disc the size of the towing ball is removably secured to the top surface of the plate just forward of the clamps. The disc is placed in a position, on the top surface of the plate, which corresponds to an apex position of the ball within the v-flange. The ball is in the apex position within the v-flange when it is in contact with the two sides of the v-shaped flange.

In operation, the trailer hitch guide is positioned under the trailer tongue so that the socket of the tongue is in a position directly over the disc mounted on the top surface of the guide plate. This places the socket directly over the apex position of the v-flange. The stop is removably secured to a position on the top surface of the guide. A rear flange of the stop fits over the forward end of the tongue in order to prevent longitudinal and orthogonal movement of the tongue relative the guide. Once the location of the stop on the top surface of the guide is determined, the disc may then be removed. The trailer hitch guide is then attached to the trailer tongue via the clamps by swivelling the clamps using the fingers, associated therewith until the clamps engage the sides of the trailer tongue. Since the clamps are eccentrically mounted onto the plate, when the clamps are swivelled around their axes toward the side surface of the trailer tongue, the side surface of each clamp will engage with the side surface of the trailer tongue. If the clamps are square or rectangular in cross section, the square corner of the clamp will engage with the side surface of the trailer tongue when the clamps are rotated. As the clamps are swivelled further, the side surface of each clamp becomes more securely engaged with the side surface of the trailer tongue. The clamps also act as a means for preventing transverse movement of the trailer tongue relative to the guide.

Once the location of the stop is determined, the disc is removed, and the trailer hitch guide is securely attached to the trailer tongue of the towed vehicle, the ball of the towing vehicle is guided into its apex position relative to the v-flange of the trailer tongue. When the ball is in its apex position, it is directly under the socket of the trailer tongue. In order to insert the ball into the socket of the trailer tongue, the tongue is raised to allow the guide to be removed. The pair of clamps are swivelled away from their contact position relative to the side surfaces of the trailer tongue. When the side surfaces of the clamps are no longer engaged with the side surfaces of the trailer tongue, the trailer hitch guide may be removed from the trailer tongue. The trailer tongue is lowered until the ball of the towing vehicle is inserted into the socket of the trailer tongue.

Consequently, by using this trailer hitch guide, the socket on the trailer tongue may be more easily and conveniently attached to the towing ball of the towing vehicle by one person without assistance.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention, will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a three-dimensional view of the trailer hitch guide of the present invention;

FIG. 2 is a top view of the trailer hitch guide of the present invention;

FIG. 3 is a bottom view of the trailer hitch guide of the present invention;

FIGS. 7A and 7B represent a top view and a side view of the stop 10C on the guide 10 of the present invention;

DETAILED DESCRIPTION OF THE DRAWINGS

Figure 4:
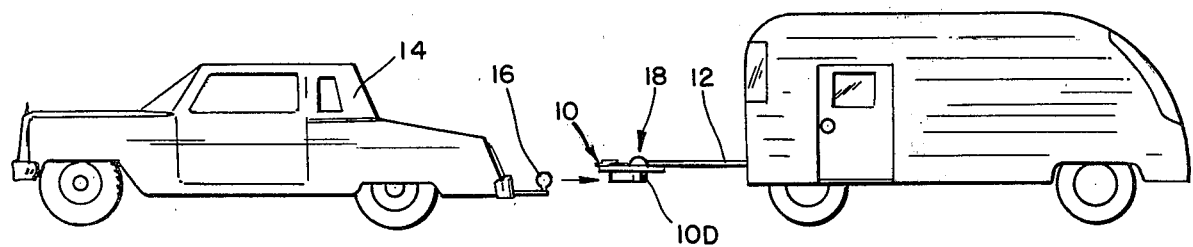
FIG. 4 is an illustration of the use of the trailer hitch guide in aiding the attachment of the socket of the trailer tongue to the ball of the towing vehicle.

Referring to FIG. 1, the trailer hitch guide 10 of the present invention includes a plate 10A having a top surface 10A1 and a bottom surface 10A2. A pair of clamps 10B have circular clamping surfaces 24 which are eccentrically mounted onto the top surface 10A1 of the plate 10A. The clamps 10B are separated from one another by a distance which corresponds approximately to a typical width dimension of a trailer tongue. Each clamp 10B has a screw 10B1 passing therethrough to permit the clamp 10B to swivel about an axis passing through the screw 10B1. Since the screw 10B1 is mounted eccentrically of circular portion 24 of the clamp 10B, allowing an eccentric movement of the clamp 10B about the axis passing through the screw, the clamp is able to swivel eccentrically about the axis in order to increase or decrease the distance between the two clamps 10B. This allows the guide 10 to adapt to trailer tongues of different widths.

A stop 10C is removably mounted on the top surface 10A1 of plate 10A. This stop 10C includes stop body 10C2 removable from the top surface of the plate 10A. A bolt 10C1 fixes the stop body 10C2 to the plate 10A. The bolt 10C1 passes through a hole 10G in the stop body 10C2. See FIG. 7A. The hole 10G is from the mid-point between a rear end 10G1 of the stop 10C and a forward end 10G2 thereof. The hole 10G is located approximately ¼" from the rear end 10G1 of the stop body 10C2. See FIG. 7B. A nut is secured to the opposite end of the bolt 10C1 for securing the stop body 10C2 to plate 10A. A plurality of holes 10F are formed in the guide spaced along a longitudinal axis of the guide passing through the body 10C2 and disc 10E, for determining optional positions of the stop 10C relative to the plate 10A of the guide 10.

On the bottom surface 10A2 of plate 10A, a flange 10D is secured thereto, the flange being shaped in the form of the letter V. The apex 10D1 of the v-flange 10D is arranged to face a rear portion 10A3 of plate 10A. The two ends of the v-flange 10D are arranged to face the two lateral portions 10A4 and 10A5 of plate 10A. The v-flange 10D extends orthogonally from the bottom surface 10A2 of plate 10A.

A disc 10E is removably secured to the top surface 10A1 of plate 10A via a screw 10E1. The disc 10E should have a diameter which corresponds to the diameter of the towing ball of the towing vehicle. In addition, the disc 10E should be secured to a position, on the top surface 10A1 of plate 10A, which corresponds to the apex position of the ball within the v-flange 10D. The apex position of the ball within the v-flange is defined as the position of the ball when the ball is in contact with both sides of the v-flange 10D and is nearest the apex position 10D1 of the v-flange 10D. When the socket of the trailer tongue is directly over the disc 10E, the socket of the trailer tongue will, in turn, be in a position directly over the ball of the towing vehicle, when the ball is in the apex position within the v-flange of the guide. At this point, it should be noted that the distance between the socket and the forward end of a trailer tongue will vary depending on the particular trailer tongue. Therefore, when the socket is in the position directly over the disc 10E, the stop 10C may be removed and resecured to the guide 10, by using holes 10F, in order to fit the rear flange 10C3 of stop 10C over the forward end of the trailer tongue. This is done by removing the stop 10C from the guide 10A and resecuring it to guide 10A, using an appropriate hole 10F, until flange 10C3 fits firmly over the forward end of the trailer tongue. Since hole 10G is offset with respect to the mid-point between ends 10G1 and 10G2 of the stop, the stop may be reversed to afford a better fit with respect to the trailer tongue. The disc 10 may then be removed since it is no longer needed. The towing ball, when placed in its apex position, will be easily inserted into the socket of the trailer tongue when the trailer hitch guide is removed from the trailer tongue.

Referring to FIG. 2, a top view of the trailer hitch guide 10 of the present invention is illustrated. Note the position of the disc 10E in its apex position relative to the v-flange 10D. The disc 10E has a diameter which corresponds to the diameter of the towing ball and is placed in a position on the top surface 10A1 of plate 10A which would correspond to the position of the towing ball when the ball is in the apex position relative to v-flange 10D.

Referring to FIG. 3, a bottom view of the trailer hitch guide 10 of the present invention is illustrated. When the socket of the trailer tongue is placed in a position which coincides with disc 10E, the stop 10C is adjusted to fit the rear flanges 10C3 over the forward end of the tongue. The disc 10E is removed, and the tongue is secured to the plate 10A, via clamps 10B. Then, when the towing ball is backed into the apex position within the guide, it will be located directly under the socket of the trailer tongue.

Referring to FIG. 4, the functional operation of the trailer hitch guide is illustrated. The trailer hitch guide is shown as being connected to the trailer tongue 12 of the towed vehicle. The disc 10E is in a position on the top surface of plate 10A corresponding to the apex position of the ball 16, and the socket 18 of the trailer tongue 12 is placed in a position relative to the top surface 10A1 of plate 10A which coincides with the disc 10E. The stop 10C is located on the top surface 10A1 of guide 10A, using holes 10F, whereby the flange 10C3 of stop 10C fits firmly over the forward end of the trailer tongue 12. The disc 10E may then be removed since it is no longer needed for that particular trailer tongue. The towing vehicle 14 has a towing ball 16 attached to the rear end thereof for engaging with the v-flange 10D of the trailer hitch guide 10. When the towing ball 16 is backed into its apex position within the v-flange 10D, the ball 16 will be directly under the socket 18 of the trailer tongue 12. Once the ball 16 is in the apex position, the trailer tongue 12 is raised temporarily to allow the driver to remove the trailer hitch guide 10 from the trailer tongue 12. This is done by swivelling clamps 10B about their axes until disengaged from the side surfaces of the trailer tongue 12. Once the trailer hitch guide is removed, the trailer tongue 12 is lowered until the towing ball 16 is inserted into socket 18.

Figure 5:
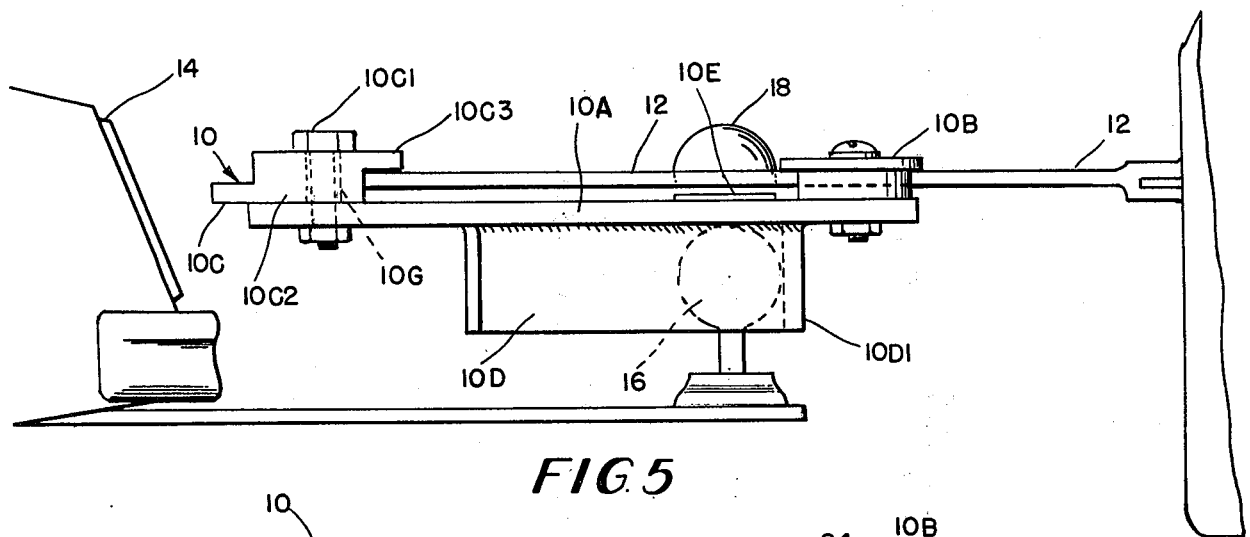
FIG. 5 represents an enlarged view of the use of the trailer hitch guide as depicted in FIG. 4 in aiding the attachment of the socket of the trailer tongue to the towing ball of the towing vehicle.

Referring to FIG. 5, an enlarged view of the trailer hitch guide 10 as illustrated in FIG. 4 is shown. The towing ball 16 is shown in its apex position. The trailer tongue 12 is shown in FIG. 5 as being clamped to the trailer guide 10 having the socket 18 in a position directly over the towing ball 16. The disc 10E may be removed, since the flange 10C3 of stop 10C has been fitted firmly over the forward end of the trailer tongue.

Once the ball has been backed into its apex position within v-flange 10D, the tongue 12 is raised in order to remove the guide 10 from the tongue 12, in the manner discussed above. The tongue 12 is lowered to insert the ball 16 within the socket 18.

Figure 6:
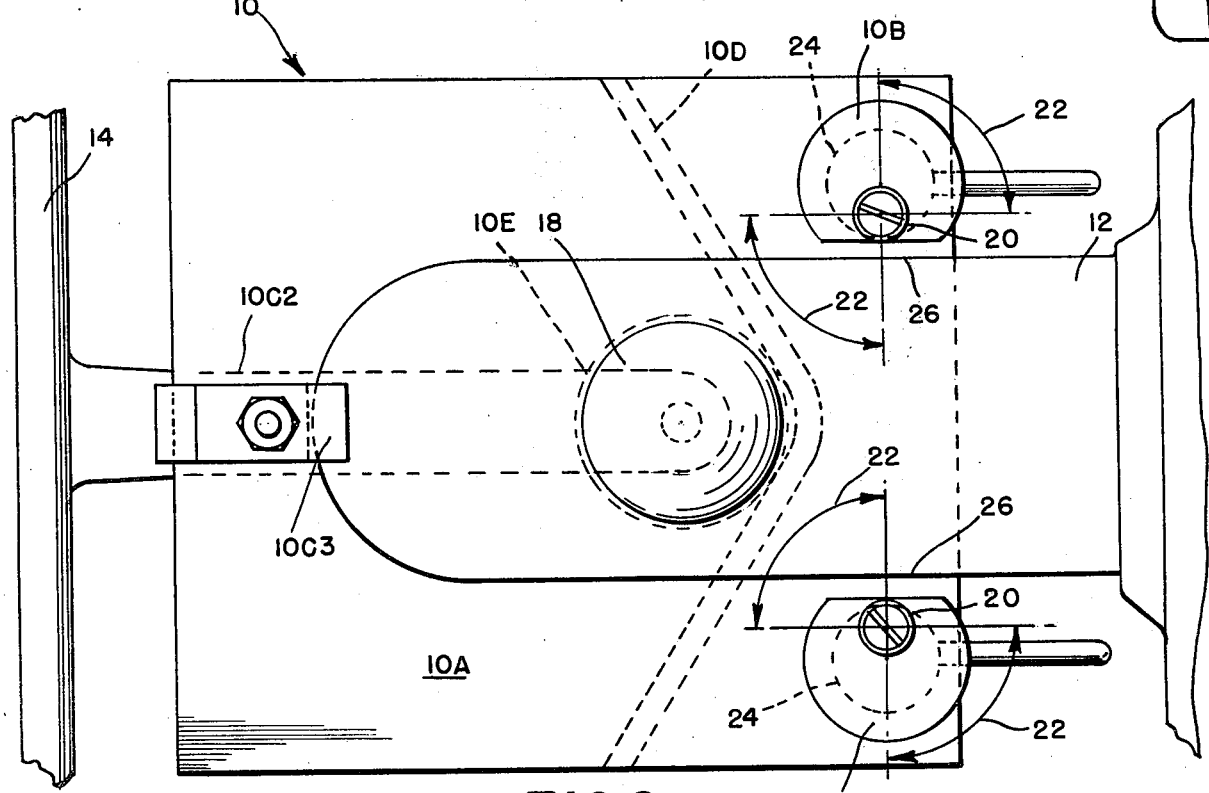
FIG. 6 represents a top view of the trailer hitch guide when the trailer tongue of the towed vehicle is inserted into the guide and the ball of the towing vehicle is in accurate alignment with the socket of the trailer tongue.

Referring to FIG. 6, a top view of the guide 10 is shown attached to the tongue 12, the ball 16 being in its apex position within the v-flange 10D. Socket 18 appears in a position which is directly over disc 10E and towing ball 16. The socket 18 is generally spherical in shape and is approximately 2" (two inches) in diameter.

Prior to backing the towing vehicle 14 into the position shown in FIG. 6, the trailer tongue 12 is secured to the trailer hitch guide 10 by swivelling clamps 10B about their axes 20 in a as illustrated by the arrows 22. In this way, the side surface 24 of each clamps 10B will engage with the side surface 26 of the trailer tongue 12. This will securely hold the trailer tongue 12 in its position with respect to the trailer hitch guide 10.

In order to mate the towing ball 16 with the socket 18, the trailer tongue 12 must be raised in order to remove the trailer hitch guide 10 from the trailer tongue 12. The clamps 10B are swivelled about their axes 20 in an opposite direction in order to remove the trailer hitch guide 10 from trailer tongue 12. Once the trailer hitch guide 10 is removed from trailer tongue 12, the tongue is lowered until the towing ball 16 is inserted into the socket 18 on the trailer tongue.

Figure 8A:
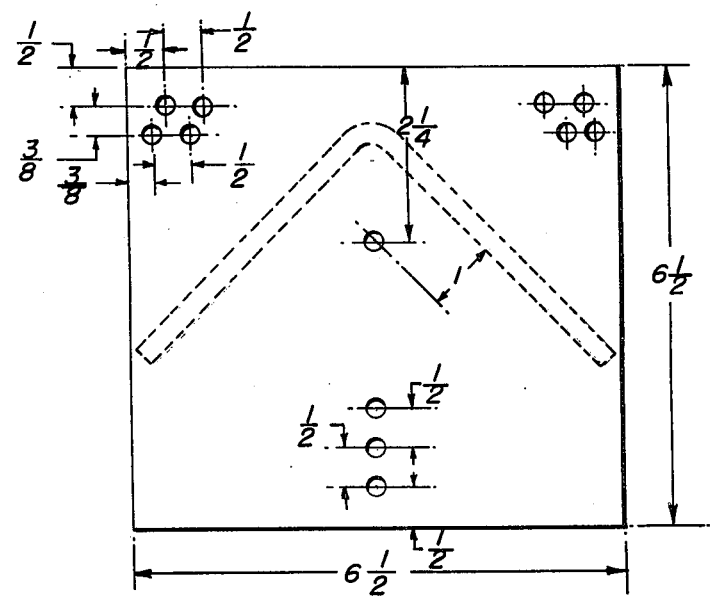
FIGS. 8A and 8B provide the necessary dimensions of the guide as well as the location of holes in the guide for location of the clamps and the stop.

In FIG. 8A, the guide 10 is shown with the clamps 10B removed, the disc 10E removed, and the stop 10C removed. The exact dimensions of an exemplary embodiment of the guide are illustrated. That is, approximately $5\frac{3}{4}'' \times 6\frac{1}{2}''$. The location of the holes in the guide for securing the stop 10C is shown. These holes are $\frac{1}{4}''$ apart, and the first hole is $\frac{1}{2}''$ from the edge of the guide. The hole for location of disc 10E is approximately 1" from the sides of flange 10D. The four holes on each corner of the flange for locations of the clamps 10B are located on axes which are $\frac{1}{2}''$ and $\frac{3}{8}''$ from one front edge of the guide. The two holes located furthest from the front edge of the guide are located $\frac{3}{8}''$ and $\frac{1}{4}''$ from the side edge of the guide. The two holes located nearest the front edge of the guide are located $\frac{1}{2}''$ and $\frac{3}{8}''$ from the side of the guide.

Figure 8B:
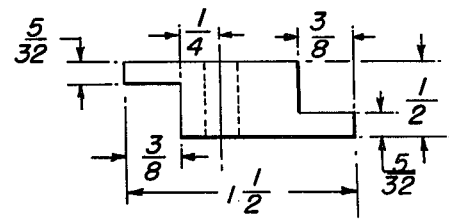

The dimensions of the stop 10C are illustrated in FIG. 8B.

Figure 9:
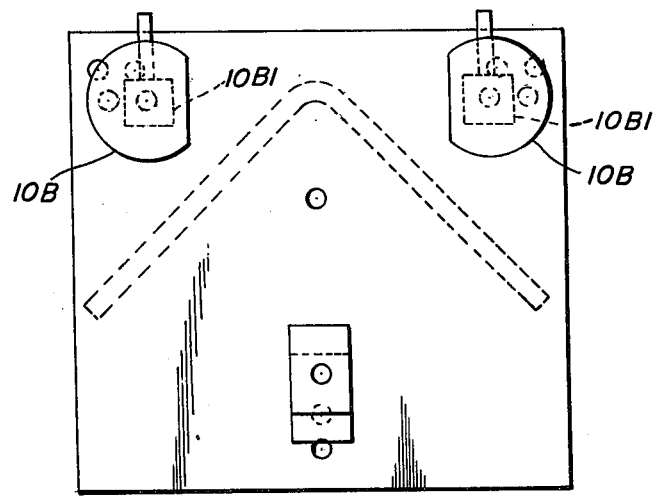
FIG. 9 represents an embodiment wherein the clamps have a square or rectangular cross-section in lieu of the eccentric circular cross-section of the clamps in the previous embodiment.

In FIG. 9, clamps 10B are illustrated as having a clamping surface with a square cross-section. The clamps 10B could also be rectangular in cross-section. The clamps 10B are pivotable about a hole in the center of each clamp. Since each clamp is square in cross-section, when the clamps 10B are rotated, the corners of the clamping surfaces engage with the side surfaces of the trailer tongue. Consequently, by turning the clamps 10B, the corners of the clamps 10B, engage the trailer tongue as would the eccentrically mounted clamps discussed in the previous embodiments.

The invention being thus described, it will be obvious that the same may be varied in many ways. Such variations are not to be regarded as a departure from the spirit and scope of the invention, and all such modifications as will be obvious to one skilled in the art are intended to be included within the scope of the following claims.

It is claimed:

1. A trailer hitch guide for guiding a towing ball on a towing vehicle into position directly under a receiving means on a trailer tongue of a towed vehicle, comprising:
    a support means;
    clamping means on a top surface of said support means for clamping said trailer tongue to said top surface;
    V-shaped flange means on a bottom surface of said support means for guiding said towing ball, said V-shaped flange having an apex;
    means on said top surface of said spport means for guiding said receiving means of said tongue into a position relative to said support means which coincides with the position of said towing ball relative to said support means when said ball is nearest the apex of said V-shaped flange; and
    stop means on said top surface of said support means for preventing longitudinal and orthogonal movement of said trailer tongue when said tongue is clamped to the top surface of said support means.

2. A trailer hitch guide in accordance with claim 1, wherein said clamping means comprises a pair of eccentrically mounted swivel clamps, each of said swivel clamps being engageable with side surfaces of said trailer tongue.

3. A trailer hitch guide for guiding a towing ball on a towing vehicle into position with respect to a receiving means on a trailer tongue of a towed vehicle, comprising:
    means for securing said guide on the trailer tongue of the towed vehicle; and
    means for guiding the towing ball into position with respect to the trailer tongue whereby the towing ball is in alignment with the receiving means of the trailer tongue;
    said securing means comprising stop means adjustably secured to said hitch guide and engageable with the end-most portion of the trailer tongue for longitudinally positioning said hitch guide on the tongue and for preventing longitudinal movement of said guide with respect to the tongue.

4. A trailer hitch guide as in claim 3, wherein said securing means further comprises clamping means selectively engageable with side surfaces of the trailer tongue.

* * * * *